United States Patent [19]

Aranguren et al.

[11] 4,143,241

[45] Mar. 6, 1979

[54] SMALL DIGITAL TIME DIVISION SWITCHING ARRANGEMENT

[75] Inventors: William L. Aranguren, Sayreville; Rollin E. Langseth, Colts Neck, both of N.J.

[73] Assignee: Bell Telephone Laboratories, Incorporated, Murray Hill, N.J.

[21] Appl. No.: 805,411

[22] Filed: Jun. 10, 1977

[51] Int. Cl.$^2$ .................. H04J 3/12; H04Q 11/04
[52] U.S. Cl. ........................ 179/15 AQ; 179/15 BY
[58] Field of Search .................. 179/15 AQ, 15 BY; 325/4

[56] References Cited

U.S. PATENT DOCUMENTS

| | | | |
|---|---|---|---|
| 3,083,267 | 3/1963 | Weller | 179/15 BY |
| 3,207,851 | 9/1965 | Fukinuki | 179/15 BY |
| 3,678,205 | 7/1972 | Cohen et al. | 179/15 AQ |
| 3,683,116 | 8/1972 | Dill | 179/15 AQ |
| 3,770,895 | 11/1973 | Krupp et al. | 179/15 AQ |
| 3,796,835 | 3/1974 | Closs et al. | 179/15 BY |
| 3,801,746 | 4/1974 | Buchner | 179/15 BY |
| 3,922,495 | 11/1975 | Donohoe | 179/15 BY |
| 4,009,346 | 2/1977 | Parker et al. | 179/15 AQ |
| 4,009,349 | 2/1977 | Belforte | 179/15 AT |
| 4,032,719 | 6/1977 | Blasbalg | 179/15 AS |

Primary Examiner—Thomas W. Brown
Attorney, Agent, or Firm—Erwin W. Pfeifle

[57] ABSTRACT

The present invention relates to a small digital time-division switching arrangement capable of interfacing with a plurality of PCM communication lines on one side and a separate plurality of transmission channels on the other side. A first processor primarily tracks call progress by scanning signalling bits indicating on/off hook state changes and a second processor controls the action of a time slot interchanger which both assembles and disassembles channel data and telemetry messages and establishes and breaks down calls while connecting appropriate service circuits to the communication lines during the progress of a call. The processors are implemented with separate microprocessor chips and associated memory and the switching arrangement can simultaneously communicate with a variety of call originating circuits employing a wide variety of control signals.

5 Claims, 4 Drawing Figures

FIG. I

SMALL DIGITAL TIME DIVISION SWITCHING ARRANGEMENT

BACKGROUND OF THE INVENTION

1. Field of the Invention

The present invention relates to a small digital time division switching arrangement and, more particularly, to a small digital time division switching arrangement comprising a pair of cooperating processors and a time slot interchanging arrangement capable of, inter alia, implementing the establishment and disassembly of a call by monitoring control signals and generating appropriate control signals during the progress of a two-way call for transmission in the appropriate direction.

2. Description of the Prior Art

In time division multiplexed (TDM) communication systems, samples from a plurality of voice or data channels are interspersed in time as, for example, found in the well-known pulse code modulation (PCM) systems. In a typical PCM system, the instantaneous amplitude of the voice or data signal is sampled at the Nyquist rate and each analog sample is encoded to produce a digitized sample which is interleaved in a cyclical manner with digitized samples from other channels of the same system for transmission to the desired destination. Since all digitized samples may not be destined for a single ultimate terminating station, an intermediate switching point is desirable which will switch each of the interleaved digitized samples from any one of the incoming PCM channels to any one of the interleaved digitized sample sequences transmitted via any one of the outgoing PCM channels.

To implement the rearrangement and interleaving of digitized sample sequences in the switching arrangement, time slot interchangers have been utilized which include a form of shift register arrangement wherein a controller activates gates to steer time slot unit signals in an input sequence from a certain input shift register location to a predetermined output location. A typical prior art time slot interchanger is disclosed in, for example, U.S. Pat. No. 3,770,895 issued to R. S. Krupp et al. on Nov. 6, 1973.

A modular switching system which transfers bits propagating on TDM transmission lines to appropriate time slots of a particular output trunk group using a time slot interchanger is disclosed in U.S. Pat. No. 3,678,205 issued to G. Cohen et al. on July 18, 1972. To implement the time slot interchange, data appearing at each incoming channel is transferred into a data memory system at a location assigned to a particular channel and time slot therein. During each time slot in the appropriate output channel, the data to be transmitted therein is read out of the channel memory system using the address previously stored in a connection and address memory. The address stored in the connection and address memory can be updated using commands from a control computer.

U.S. Pat. No. 3,796,835 issued to F. H. Closs et al. on Mar. 12, 1974 discloses a switching system for TDM data capable of transmitting voice or high speed data, and signalling information or low speed data between a plurality of stations by employing an asynchronous submultiplex channel for the low speed data transmission. In the system, incoming highways are cyclically scanned and the signals in each time slot are stored in separate arbitrary locations of an information storage means as determined by an address storage means. The information storage means is then cyclically accessed for read out of the interleaved and rearranged time slots.

The prior art switching arrangements merely provide the capability of switching time slots from one system to another without responding to signalling bits which may be included in the received signals and request some special service. Although very large machines may provide such capability, the problem remaining is to provide a small digital time division switching arrangement which will interface with a plurality of TDM systems to provide simultaneous switching of a plurality of input channels to a plurality of output channels while communicating with a variety of signalling circuits at remote points by appropriately interspersing desired control signals.

SUMMARY OF THE INVENTION

The present invention relates to a small digital time division switching arrangement and, more particularly, to a small digital time division switching arrangement comprising a pair of cooperating processors and a time slot interchanging arrangement capable of, inter alia, implementing the establishment and disassembly of a call by monitoring control signals and generating appropriate control signals during the progress of a two-way call for transmission in the appropriate direction.

It is an aspect of the present invention to provide a small common-control, bus-oriented digital time division switching arrangement using a time slot interchanger which can be implemented with a pair of microcomputer chips and associated memory which will provide simultaneous two-way switching of data between incoming and outgoing channels and the ability to communicate with a variety of signalling circuits using a variety of control signals.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

The present invention is described hereinafter primarily with relation to a small time-division switching arrangement for interfacing between a plurality of terrestrial T-1 carrier digital time-division communication systems and a digital satellite communication system. However, it will be understood that such description is exemplary only and is for purposes of exposition and not for purposes of limitation. It will be readily appreciated that the inventive concept is equally applicable for interfacing with any other type of terrestrial or satellite digital time-division systems including those using time division multiple access (TDMA). The number of such systems interfacing with the present switching arrangement is dependent on the transmission rates of the connected systems and the call handling capacity of the circuitry within the present switching arrangement.

Figure 1:
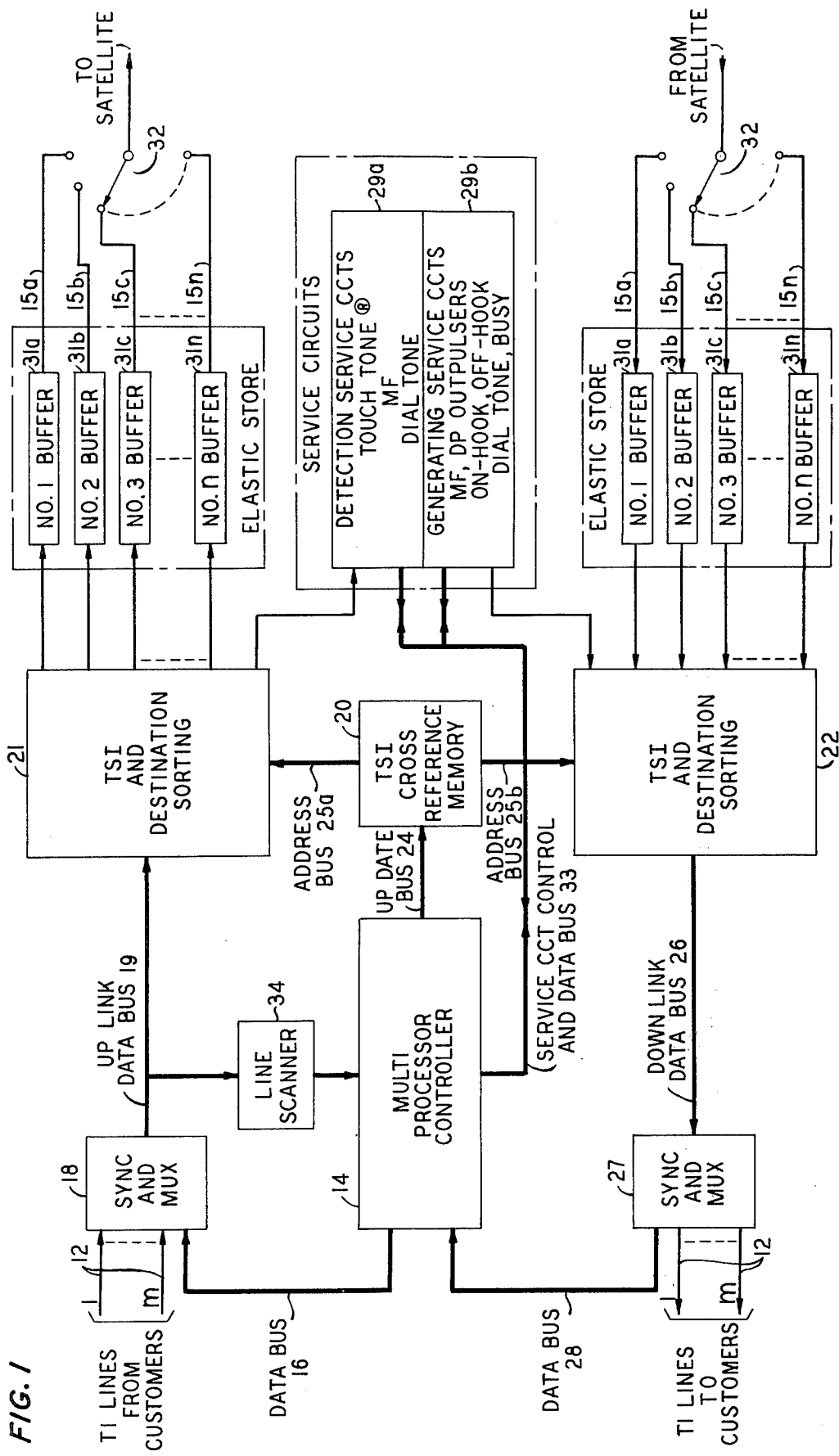
FIG. 1 is a simplified block diagram of a small digital time-division switching arrangement in accordance with the present invention.

Turning now to the drawings, FIG. 1 illustrates a block diagram of a small digital time-division switching arrangement formed in accordance with the present invention for interfacing with a plurality of m T-type terrestrial digital carrier systems on the one side and a plurality of n digital satellite communication channels on the other side. In FIG. 1, a plurality of m incoming T-carrier lines are received on lines 12, where for purposes of illustration $m = 30$, in addition to digital telemetry information signals which are generated by a multiprocessor controller 14 for transmission on the n satellite channels 15a–15n and made available on a bus 16. Bus 16 is the equivalent of p T-type carrier lines, which for purposes of illustration $p = 2$. Therefore, the present arrangement is capable of handling 32 T-carrier input lines.

As is well known in the art, a T-carrier system combines 24 voice channels into a single pulse amplitude modulated wave by time-division multiplexing. The sample rate for each channel is 8000 samples per second and each sample is encoded into a pulse code modulation (PCM) signal for transmission over the line, where each signal comprises an 8-bit byte which includes the PCM signal and signalling bits interspersed therewith.

Figure 2:
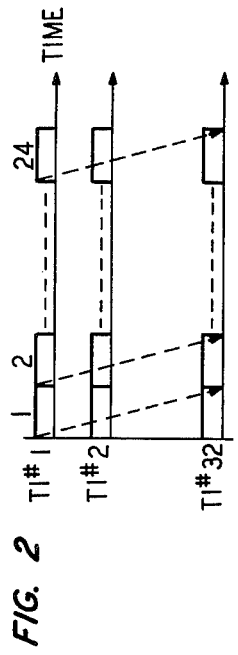
FIG. 2 illustrates a raster-scan technique for multiplexing the signals from 32 input T-carrier lines.

In FIG. 1, incoming T-carriers on lines 12 must first be brought into signalling frame synchronization and then multiplexed. Methods for accomplishing synchronization can include any suitable technique such as, for example, clock slipping or buffering. Once synchronized, the T-carriers are multiplexed by bytes in, for example, a raster-scan fashion as shown in FIG. 2. The synchronization and multiplexing is performed in a synchronization and multiplexing circuit 18 and the output signal therefrom is transmitted onto an 8-bit wide data bus 19. The raster-scan method of multiplexing permits use of slower, lower power logic families than would have been required by, for example, an equivalent serial multiplexer.

The output signals from synchronization and multiplexing circuit 18 are transmitted on a bus 19 and are next processed by a time slot interchanger (TSI) comprising a multiprocessor controller 14, a TSI cross reference memory 20 and an up-link and a down-link TSI and destination sorting arrangement designated 21 and 22, respectively. TSI cross reference memory 20 comprises a plurality of memory locations with each memory location being assigned to one of the time slots associated with each of the T-1 carrier lines 12 and the equivalent T-1 lines associated with bus 16. Therefore, for the exemplary 32 T-1 input lines, where each line comprises 24 separate time slots, TSI cross reference memory 20 would contain 768 memory locations. Stored at each of these memory locations is a storage location address associated with a memory location within TSI and destination sorting circuits 21 and 22, these storage location addresses being temporarily assigned and updated by multiprocessor controller 14 via up-date bus 24 for each of the associated time slots. Each of the memory locations in TSI cross reference memory 20 is sequentially accessed in synchronism with information from the associated time slot appearing on up-link bus 19, which is in accordance with the raster-scan technique of FIG. 2. The storage location address stored in the accessed memory location in memory 20 is concurrently transmitted on buses 25a and 25b to TSI and destination sorting circuits 21 and 22, respectively. This storage location address is used to access circuits 21 and 22 to both permit the storage of the information received in the associated time slot on up-link bus 19 in the indicated storage location within circuit 21 and cause the read-out of information stored in the indicated storage location within circuit 22 onto down-link bus 26 for transmission in the associated time slot to the corresponding T-1 line customer via a synchronization and multiplexer circuit 27.

Because of the particular configuration of the Time Slot Interchange (TSI) hardware, the data appearing on the down-link data bus 26 and that appearing on the up-link data bus 19 carry complimentary directions on the same circuit; this characteristic environment is what is needed for digital common-control echo suppressors. In addition to the T-1 lines, multiplexer 18 also receives as an input on bus 16 the equivalent of two T-1 lines which carry telemetry information signals destined for other earth stations for call set-up and breakdown. Similarly, telemetry information signals from other earth stations are received via down-link satellite channels 15a–15n and are transmitted to multiprocessor controller 14 via synchronization and multiplexer circuit 27 and bus 28.

TSI and destination sorting circuits 21 and 22 each comprise a plurality of memory locations which are subdivided into separate areas and assigned to each of the n satellite channels 15a–15n and a plurality of peripheral service circuits 29a and 29b. The number of memory locations assigned to each of the satellite channels 15a–15n and peripheral service circuits 29a and 29b can be arbitrary but preferably assignment is accomplished in accordance with expected traffic demands to each of the channels or circuits. As shown in FIG. 1, peripheral service circuits 29a and 29b are located on the up-link and down-link side, respectively, of the time slot interchanger. The peripheral service circuits 29a and 29b are nothing more than special destinations used at various times during call set-up, and so appear on the output, or satellite, side of the interface. Access to them is controlled, of course, by the same TSI process used to connect a terrestrial T-1 circuit to a satellite circuit. The peripheral service circuits 29a on the up-link side of the TSI comprises primarily detection type circuits which would be used to store signalling information from a T-1 line such as, for example, the number of a called party which may subsequently have to be sent via telemetry signals on a satellite channel 15a–15n to the destined earth station. Peripheral service circuits 29b on the down-link side of the TSI comprise generating type service circuits which can store both (a) signals received via telemetry signals on satellite channels 15a–15n from other earth stations during the progress of a call for subsequent transmission via the appropriate T-1 line and time slot, and (b) signals which must be transmitted via a T-1 line and time slot for indicating a particular stage of a call, as, for example, dial tone, busy, etc. For the latter type signals, a separate memory location within TSI and destination sorting circuit 22 would be assigned to each different service signal and such memory locations would contain the digital representation of the PCM signal necessary to produce each of the associated service signals. Each of such memory locations could be connected to one or more, or all, of the T-1 circuits via down-link bus 26 and synchronization and multiplexer circuit 27, by multiprocessor controller 14 inserting the address of the desired service circuit in each of the associated time slot memory locations in cross reference memory 20 to which a particular service circuit is to be connected. In this manner one memory location can be used to, for example, provide dial tone to one or more T-1 circuits by reading the stored signal onto down-link bus 26 in synchronism with synchronization and multiplexing circuit 27 accessing the particular T-1 line and time slot requiring the desired service signal. It is to be understood that the service circuits listed in FIG. 1 and mentioned hereinabove are exemplary only and for purposes of illustration and not for purposes of limitation. It will be readily appreciated that any service signal which may be applicable to a particular system being connected to the present arrangement can be substituted for any one of those shown.

Transmission of the signals on the up-link channels 15a-15n and reception of signals from down-link channels 15a-15n can be achieved directly from the memory locations assigned to each channel in TSI and destination sorting circuits 21 and 22, respectively. However, where the satellite system has a single universal clock for synchronizing all the earth station transmissions and receptions, something must be done to compensate for the variable satellite channel path lengths as the satellite moves in space. For example, as the satellite moves closer to an earth station, the bits will be received via down-link channels 15a-15n at the ground station at a faster rate than they are dispelled via the T-lines 12. One possible solution is to drop or stuff bits as required. Another possible solution is to provide an efficient elastic store of sufficient length to take up the slack, and such solution is illustrated in FIG. 1.

In FIG. 1 a separate elastic store buffer 31a-31n is associated with each up-link and down-link channel 15a-15n, respectively. To provide the elasticity, the memory locations in TSI and destination sorting circuits 21 and 22 associated with each of satellites channels 15a-15n are connected to the corresponding elastic store buffer 31a-31n. For the up-link side, information stored in circuit 21 and destined for a particular channel is transferred to the corresponding one of buffers 31a-31n and subsequently transferred to the satellite via, for example, a time-division multiple access (TDMA) burst when that buffer is accessed by switch 32. For the down-link side the operation is performed in a reverse manner to that described hereinbefore for the up-link side.

Two advantages are achieved by using the elastic store technique. First it solves the initial problem of satellite motion. Second, elastic storage is a useful device when considering dynamic channel assignment. If a given destination buffer 31 is being only partially filled each frame, it is possible to allow another destination having greater traffic demands to alternately share the satellite channel time slots while the low-use customer fills additional frames into his elastic buffer 31. This elastic buffer 31 can comprise any suitable means such as, for example, an integrated circuit under the label of first-in first-out memory, or FIFO.

The general operation of the arrangement of FIG. 1 operating in the environment of an earth station will now be described.

In essence, the output bit stream toward the satellite on channels 15a-15n is a time-division multiplexed collection of digital trunk circuits. On a short-term basis, at least, these satellite circuits will be grouped by destination, where destination means a specific other earth station. The total number of circuits, or bits per second, available for transmission to all destinations depends, of course, on the satellite capacity; the latter, in turn, depends on whether the satellite uses either an area coverage antenna or a spot-beam antenna which allows reuse of the frequency band. In the latter case, the TDM bursts may carry information to control a satellite switch in order to permit connection to the proper down-link beam. In any case, the earth station will contain a set of transmit and receiver buffers 31a-31n corresponding to each of the possible destinations.

The essential function of the present interface is to sort or switch input circuits from the T-carriers lines 12 into the proper output buffer 31a-31n. The proper buffer will be determined by, for example, customer-dialed digits, using appropriately-defined codes for all of the possible locations in a given customer's network. In this way, for example, a Tandem Tie Trunk Network (TTTN) customer can dial all the necessary digits at once, and the interface, operating essentially as a register-sender common control switch, will automatically complete the connection through the satellite to a similar interface at the other end.

Figure 3:
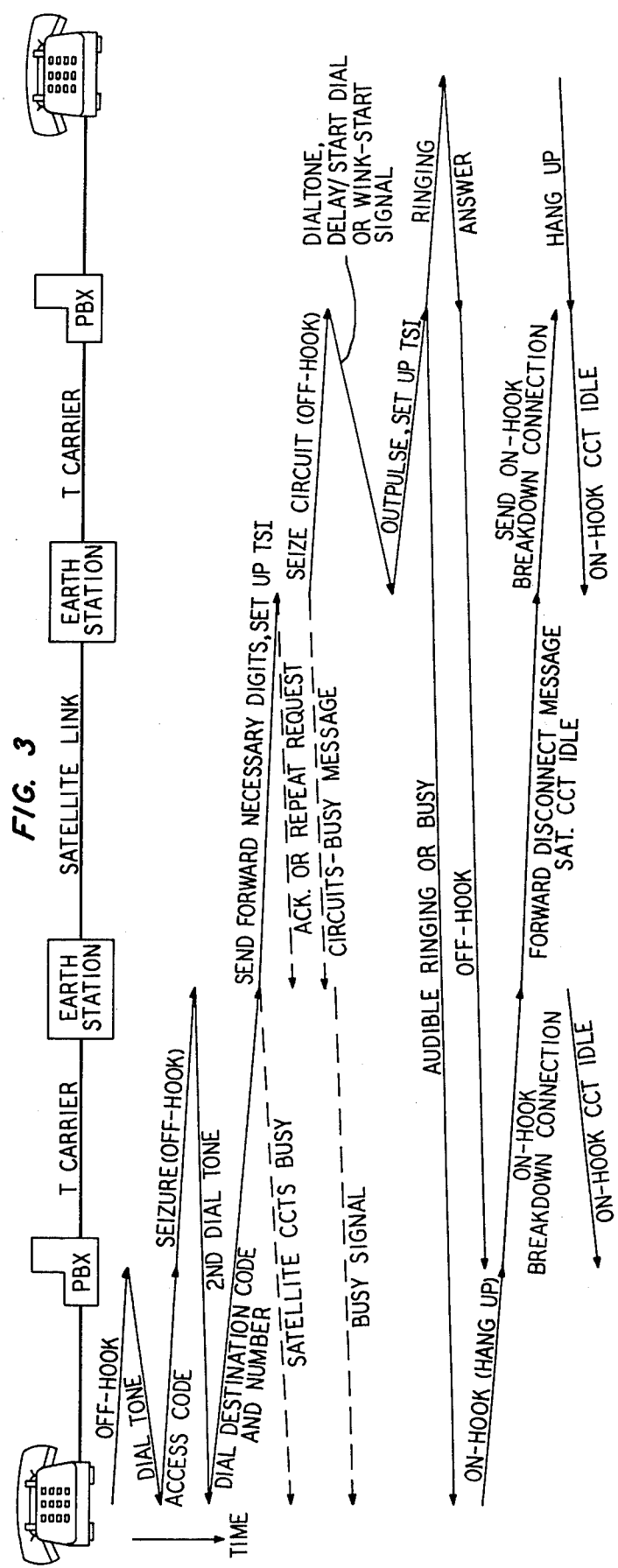
FIG. 3 illustrates a typical signalling flow between two remote customers via a satellite link.

More particularly, the set up of a typical call in, for example, the private line service environment will be considered, beginning at an originating customer's telephone and following its progress towards the destination. FIG. 3 shows the flow of control and address signalling between various entities during call set up; much of this is similar in philosophy to inter-toll signalling in the present telephone plant. The initial stages of call setup for a TTTN customer proceed as usual. Namely, the customer goes off-hook and gets local dial tone from his Private Branch Exchange (PBX). Then he dials an access code, which now causes the PBX to seize a T-1 carrier trunk to the nearby earth station, rather than a trunk to another PBX in a chain of PBXs and change the signalling bit transmitted on that trunk. At this point, in the earth station as shown in FIG. 1, multiprocessor controller 14 detects the origination of the call by the change in the state of the received signalling bit as a result of the line scanner 34 interrogating the incoming signalling bits. Multiprocessor controller 14 next writes into TSI cross reference memory the address of the dial tone generating service circuit 29b in TSI and destination sorting circuit 22 and a second dial tone is sent via synchronization and multiplexing circuit 27 to the T-1 customer. When the TTTN customer starts dialing the called number digits, the scanning process detects such start and multiprocessor controller 14 first removes dial tone and then collects the necessary dialed digits to complete the call by, for example, updating the address in TSI cross reference memory 20 associated with this TTTN customer to include the address within TSI and destination sorting circuit 21 of the appropriate one of the detection service circuits 29a which may also correspond to the off-hook generating service circuit 29b in TSI and destination sorting circuit 22 since that T-1 line is to be marked busy.

Next multiprocessor controller 14 interprets the stored dialed digits and seeks an available time slot memory location within circuit 21 for transmission of the dialed code to the desired destination via telemetry signals. If no time slot is available, controller 14 updates memory 20 associated with the exemplary TTTN customer to include the address in circuit 22 associated with the fast busy generating service circuit 29b, which signal is then returned to the customer. If, however, a time slot is available, controller 14 forms a telemetry message for transmission via data bus 16 and TSI and Destination Sorting circuit 21 to inform the destination earth station of the fact of seizure of the time slot and of the dialed digits necessary to complete the call. At this point, the terminating earth station may acknowledge either correct reception or request a repeat, in case an error is detected, via telemetry signals returned on channels 15a–15n.

Once the destination earth station has all the necessary information, it seeks a circuit (trunk) on the appropriate outgoing T-carrier. If none is available, a telemetry message is sent back to the originating earth station instructing controller 14 to return the "trunks-busy" signal to the originating customer by updating the memory 20 location to include the address of the "trunks-busy" service circuit 29b in circuit 22. Suffice it to say that the busy signal is not returned directly from the terminating earth station to the TTTN originating customer because of the architecture of the earth stations. If a T-carrier circuit is available, the terminating earth station seizes it by controlling the appropriate signalling bit on the outgoing T-carrier line.

The call set up is completed by controller 14 at the terminating earth station causing the outpulsing of the stored dialed digits to the terminating PBX in response to the terminating controller detecting a "start dial" signal from the PBX. The present earth station interface controller 14 will be capable of responding to the usual delay/start dial or wink-start signals from register-sender PBXs. Additionally, controller 14 will have the ability to work with the dial-tone start signal that is characteristic of TTTN PBXs. In this way, no major modification of TTTN PBXs would be required to permit them to operate in this system.

After outpulsing, the satellite circuit is connected to the terminating end T-carrier circuit, and audible ringing or busy is returned in the usual way to the originating customer over the satellite channel. Trunk supervision, i.e., on- or off-hook, passes back over the satellite circuit 15a–15n to the originating PBX when the called party answers. For this to occur, however, all T-carrier systems must be in signalling-frame synchronization.

At the completion of a call, a customer hangs up and the corresponding PBX releases the trunk circuit to the associated earth station. The associated earth station controller 14 detects the on-hook condition via scanner 34 and then generates a forward disconnect message for transmission via telemetry signals to the terminating end, breaks down the terrestrial-satellite connection by updating memory 20 and returns an idle state back to the PBX by assigning the "idle" service circuit 29b to the appropriate time slot in memory 20. The near-terrestrial circuit is now available for use by another customer. The terminating earth station, upon receiving the forward disconnect message, sends the on-hook (idle) condition to the terminating PBX, breaks down the connection, and awaits the return of an on-hook signal when the called customer hangs up. Until this happens, or until the terminating PBX times out and releases, the terrestrial trunk is still unavailable for new use; however, the satellite circuit is available for a new use by either end of the link.

Figure 4:
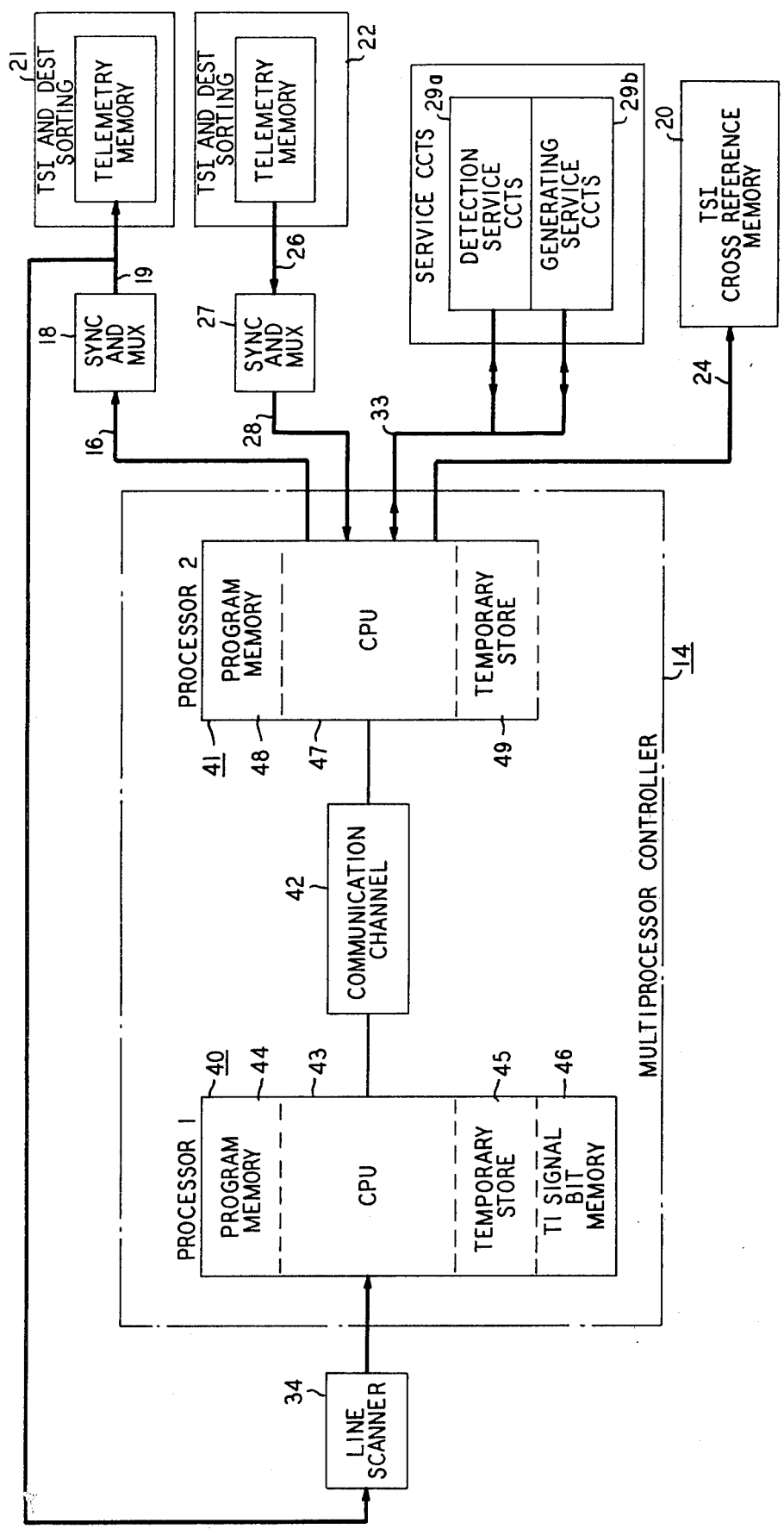
FIG. 4 is a block diagram of a multiprocessor controller arrangement for controlling the actions of the small digital time-division switching arrangement of FIG. 1.

To implement the scanning and time slot interchanging functions described hereinbefore, FIG. 4 illustrates a preferred arrangement for multiprocessor controller 14. In FIG. 4, multiprocessor controller 14 is shown as comprising a first processor 40 and a second processor 41 which are interconnected via a communication channel 42. First processor 40 is primarily concerned with line scanner 34 and comprises a central processing unit (CPU) 43, an associated program memory 44 comprising instructions for controlling the operation of CPU 43, a temporary store 45 and a T-1 signalling bit memory 46. Temporary store 45 comprises a plurality of memory locations which temporarily store processed information relating to, for example, (a) the current state of each input line and the associated time slots (busy, idle, etc.), (b) devices at the T-1 customer's premises to permit an appropriate service circuit 29a and 29b to be connected thereto during call setup, etc., (c) the most recently detected T-1 signalling bit states, and (d) the connection during a call which has been setup between a T-1 and line time slot and the satellite channel and time slot. T-1 signalling bit memory 46 functions to store the newly detected signalling bits from line scanner 34 which are then compared with corresponding bits in temporary store 45 by CPU 43 to detect on-/off-hook state changes at each T-1 customer and these newly detected bits are then written into temporary memory 45 for comparison with the next batch of newly detected signalling bits. The line scanning function performed by CPU 43 is actuated by an interrupt pulse from synchronizing circuit 18 which generates the interrupt signal at the start of each frame containing signalling bits.

Second processor 41 is primarily concerned with the time slot interchanging function and comprises a central processing unit (CPU) 47, a program memory 48 comprising instructions for controlling the operation of CPU 47, and a temporary store 49 which functions to, for example, track the availability of satellite circuits and maintain a map of the two way connections of T-1 line and satellite circuits after call setup. CPU 47 is interconnected to detection and generating service circuits 29b, via control and data bus 33 to enable it to control these service circuits in addition to enable it to store telemetry information, such as a called party's number, received via a satellite circuit or to read information stored in a service circuit 29a and 29b to, for example, make proper connections. CPU 47 is also interconnected to TSI cross reference memory 20 via bus 24 to enable the updating of addresses stored in memory 20 as was described hereinbefore. CPU 47 also functions both to generate telemetry information for storage in TSI and destination sorting circuit 21 via bus 16, synchronizing and multiplexing circuit 18 and bus 19 and to receive telemetry information from a satellite circuit and stored in TSI and destination sorting circuit 22 via bus 26, synchronization and multiplexing circuit 27 and bus 28. Communication channel 42 is a bus between CPU 43 and CPU 47 which permits the two CPUs to communicate and transfer information pertinent to switching of calls between the up-link and down-link T-1 lines and satellite channels.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A small digital time-division switching arrangement for interfacing with a plurality of m synchronized and multiplexed two-way digital time-division communication system channels on one side of the arrangement and a plurality of n multiplexed two-way digital time-division transmission channels and a plurality of s peripheral service circuits on the other side of the arrangement, each of the channels propagating data and directive signalling bits in an associated plurality of sequential time slots thereof, the arrangement comprising:

means for scanning the directive signalling bits received in the sequential time slots of the plurality of m synchronized and multiplexed digital time-division communication system channels;

a multiprocessor controller comprising a first microprocessor, a second microprocessor and an intercommunication channel interconnecting said microprocessors, said first and second microprocessors being arranged to (a) detect changes in corresponding sequentially received directive signalling bits scanned by said scanning means and generate an appropriate output signal in response to a detected change for implementing a predetermined action by the arrangement, and (b) generate appropriate directive signalling bits for transmission through the arrangement and in preselected time slots of the plurality of m communication system channels and the plurality of n transmission channels;

means for storing the output signals of said multiprocessor controller and for generating a separate appropriate switching signal in synchronism with the appearance of data and directive signalling bits in each of the time slots of the synchronized and multiplexed plurality of m two-way communication system channels for interrelating each of said time slots with either one of a particular one of the time slots of the plurality of n transmission channels and a particular one of the plurality of s peripheral service circuits; and a time slot interchanging means comprising a first and a second memory section for storing signals propagating in a first and a second direction, respectively, between the interfaced plurality of m two-way communication system channels and both the plurality of n two-way transmission channels and the plurality of s peripheral service circuits, each memory section comprising a plurality of memory locations with each of said memory locations being assigned to a separate one of the time slots associated with each channel of said plurality of n transmission channels and an appropriate one of said plurality of s peripheral service circuits, the pair of memory sections being concurrently responsive to the reception of each of said separate appropriate switching signals generated by said storing and switching signal generating means to transfer data and signalling bits bidirectionally between the time slots of the plurality of m communication system channels and either one of the time slots of said plurality of n transmission channels and said plurality of s peripheral circuits.

2. A small digital time-division switching arrangement according to claim 1 wherein said first microprocessor is arranged to perform said detection of changes in corresponding sequentially received directive signalling bits and to generate a signal on said intercommunication channel to said second microprocessor in response to a detected change of state between two corresponding sequentially received directive signalling bits; and said second microprocessor is arranged to generate both said appropriate directive signalling bits and said appropriate switching signals in response to both said first microprocessor generated signals received via said intercommunication channel and the directive signalling bits received via the plurality of n transmission channels.

3. A small digital time-divison switching arrangement according to claim 2 wherein said means for storing output signals and generating a separate appropriate switching signal comprises both a time-slot interchanging means cross reference memory including a separate memory location for each of the time slots associated with each of the plurality of multiplexed m time-division communication system channels for storing each appropriate switching signal generated by said second microprocessor in the memory location assigned to the time slot associated with said appropriate switching signal, and an accessing means for sequentially accessing the memory locations of said cross reference memory in synchronism with the reception in the arrangement of the associated time slot signals of said plurality of m multiplexed communication system channels for concurrently transmitting the appropriate switching signal stored therein to the first and second memory sections of said time slot interchanging means.

4. A small digital time-division switching arrangement according to claim 3 wherein each of the first and second memory sections of said time slot interchanging means comprises a separate memory location for each of the time slots associated with each of the plurality of n multiplexed transmission channels and each of the plurality of s peripheral service circuits associated with the particular memory section, and accessing means responsive to the appropriate switching signal transmitted by said time-slot interchanging means cross reference memory to concurrently access said first and second memory sections at the memory location defined by said switching signal for storing the signals arriving in the associated time slot of the multiplexed two-way communication channel in the accessed memory location of said first memory section while concurrently transmitting the contents of the accessed memory location of said second memory section in the associated time slot of the multiplexed two-way communication channel.

5. A small digital time-division switching arrangement according to claim 1 wherein each of the first and second memory sections of said time slot interchanging means comprises a separate memory location for each of the time slots associated with the plurality of n multiplexed transmission channels and each of the plurality of s peripheral service circuits associated with the particular memory section, and accessing means responsive to the appropriate switching signal transmitted by said means for storing output signals and generating a separate appropriate switching signal for storing the signal received in the associated time slot of the appropriate one of the plurality of m multiplexed two-way communication system channels in the first memory section memory location indicated by said appropriate switching signal while concurrently accessing the memory location of said second memory section indicated by said appropriate switching signal to transmit the signals stored therein in the corresponding associated time slot of the appropriate one of the plurality of m multiplexed two-way communication system channels.

* * * * *